(12) United States Patent
Barnes

(10) Patent No.: US 9,784,351 B1
(45) Date of Patent: Oct. 10, 2017

(54) GEARLESS FLUIDIC AUTOMATIC TRANSMISSION

(71) Applicant: Freddie L. Barnes, Columbus, GA (US)

(72) Inventor: Freddie L. Barnes, Columbus, GA (US)

( * ) Notice: Subject to any disclaimer, the term of this patent is extended or adjusted under 35 U.S.C. 154(b) by 328 days.

(21) Appl. No.: 14/712,459

(22) Filed: May 14, 2015

(51) Int. Cl.
 F16D 33/00 (2006.01)
 F16H 41/04 (2006.01)
 B60K 17/10 (2006.01)

(52) U.S. Cl.
 CPC .............. *F16H 41/04* (2013.01); *B60K 17/10* (2013.01); *F16D 33/00* (2013.01)

(58) Field of Classification Search
 CPC ........... F16H 41/04; F16D 33/00; F16D 33/18
 USPC ........................................................ 60/330
 See application file for complete search history.

(56) References Cited

U.S. PATENT DOCUMENTS

| 4,672,810 A  * | 6/1987  | Marlowe ................. F16H 61/52 |
|  |  | 60/332 |
| 6,711,896 B1 * | 3/2004 | Johnson .................. F16D 33/00 |
|  |  | 60/363 |
| 6,877,593 B2 * | 4/2005 | Johnson .................. F16D 31/06 |
|  |  | 60/363 |
| 7,810,322 B2 * | 10/2010 | Rez ......................... F16D 33/00 |
|  |  | 60/348 |
| 7,914,417 B2 | 3/2011 | Lee |
| 8,087,487 B2 | 1/2012 | Mustafa |
| 8,336,304 B2 * | 12/2012 | Mustafa .................. F02B 33/40 |
|  |  | 60/348 |

\* cited by examiner

*Primary Examiner* — Michael Leslie
(74) *Attorney, Agent, or Firm* — Stevenson IP, LLC

(57) ABSTRACT

A gearless fluidic automatic transmission with an impeller shaft driven by an existing engine. The impeller shaft is radially surrounded by a hollow frustrum with a plurality of curvilinear vanes. The vanes transfer fluid to and through a plurality of canted blades in operational communication with a turbine shaft. A power transmitted to the turbine shaft is used to drive a chosen vehicle.

1 Claim, 3 Drawing Sheets

GEARLESS FLUIDIC AUTOMATIC TRANSMISSION

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Of the various types of fluidic automatic transmissions know in the prior art, virtually all are relatively complex. Virtually all are multi-geared, from early two-speed automatic transmissions to modern nine-speed automatic transmissions. In keeping with complexity and multiple speeds, repairs become increasingly more expensive, especially with more parts to fail than in early automatic transmissions. A relatively basic automatic transmission has been needed, one that does not require a plurality of gear changes. What has been needed is an automatic transmission with an output shaft velocity determined by a power and velocity transferred by an engine to an input shaft of the needed transmission. The present gearless fluidic automatic transmission provides for such needs.

FIELD OF THE INVENTION

The present gearless fluidic automatic transmission relates to automatic transmissions and more especially to a gearless fluid driven automatic transmission.

SUMMARY OF THE INVENTION

The general purpose of the gearless fluidic automatic transmission, described subsequently in greater detail, is to provide a gearless fluidic automatic transmission that has many novel features that result in a gearless fluidic automatic transmission which is not anticipated, rendered obvious, suggested, or even implied by prior art, either alone or in combination thereof.

To accomplish this, the gearless fluidic automatic transmission has an origin and a terminus spaced apart from the origin. A frustoconical first housing has a first larger end disposed adjacent the origin and a first smaller end spaced apart from the first larger end. A frustoconical second housing has a second smaller end affixed to the first smaller end. A second larger end is spaced apart from the second smaller end. A frustoconical third housing has a third larger end affixed to the second larger end. A third smaller end is spaced apart from the third larger end. The third smaller end is the terminus.

A provided cover plate has a centrally disposed first bearing. The cover plate has a perimeter bevel and a tapered lip facing the terminus. The tapered lip removably fits to the first larger end. An impeller shaft has a first end and a second end spaced apart from the first end. The impeller shaft is disposed within the first housing and within the second housing second smaller end. The first end is disposed through the first bearing. The impeller shaft is configured to be turned by an engine. A plurality of equally spaced apart impeller rays radiates outwardly from the impeller shaft. A hollow impeller frustum is supported distally from the impeller shaft by the impeller rays. A plurality of equally spaced apart canted curvilinear vanes is disposed outwardly on the hollow impeller frustum.

A turbine shaft is disposed centrally within the second housing and the third housing. The turbine shaft has a shaft first end and a shaft second end. A plurality of equally spaced apart turbine rays radiates outwardly from the turbine shaft. A hollow cylinder is supported distally from the turbine shaft by the turbine rays. A plurality of canted blades radiates outwardly from the hollow cylinder. The canted blades are disposed centrally on the cylinder. The canted blades are disposed in a plurality of rows.

A provided bearing assembly has an outer annulet spaced apart from an inner annulet disposed medially to the outer annulet. A bearing race is disposed within and spaced apart from the inner annulet. The outer annulet, the inner annulet, and the bearing race are supported by a plurality of equally spaced apart turbine rays. A second bearing is disposed within the bearing race. A third bearing is disposed within the bearing race. The third bearing is more proximal the terminus than the second bearing. A fourth bearing is disposed centrally within the terminus. The impeller shaft is disposed within the first bearing and the second bearing. The turbine shaft is disposed within the third bearing and the fourth bearing. The canted curvilinear vanes and the canted blades are canted in a like direction.

A fluid is disposed within the first housing, the second housing, and the third housing. As the engine drives the impeller shaft, the canted curvilinear vanes are turned. The canted blades are driven by the fluid pushed by the canted curvilinear vanes. A speed of the canted blades is determined by a velocity of the impeller shaft which in turn determines a velocity of the turbine shaft via the fluid. The turbine shaft transfers power to a vehicle. A viscosity of the fluid also determines the turbine shaft velocity. The fluid passes the canted curvilinear vanes and the canted blades. The fluid returns progressively from the third housing through the hollow cylinder, through the hollow impeller frustum and into the first housing where the fluid is subject to a continuous further like travel.

Thus has been broadly outlined the more important features of the present gearless fluidic automatic transmission so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
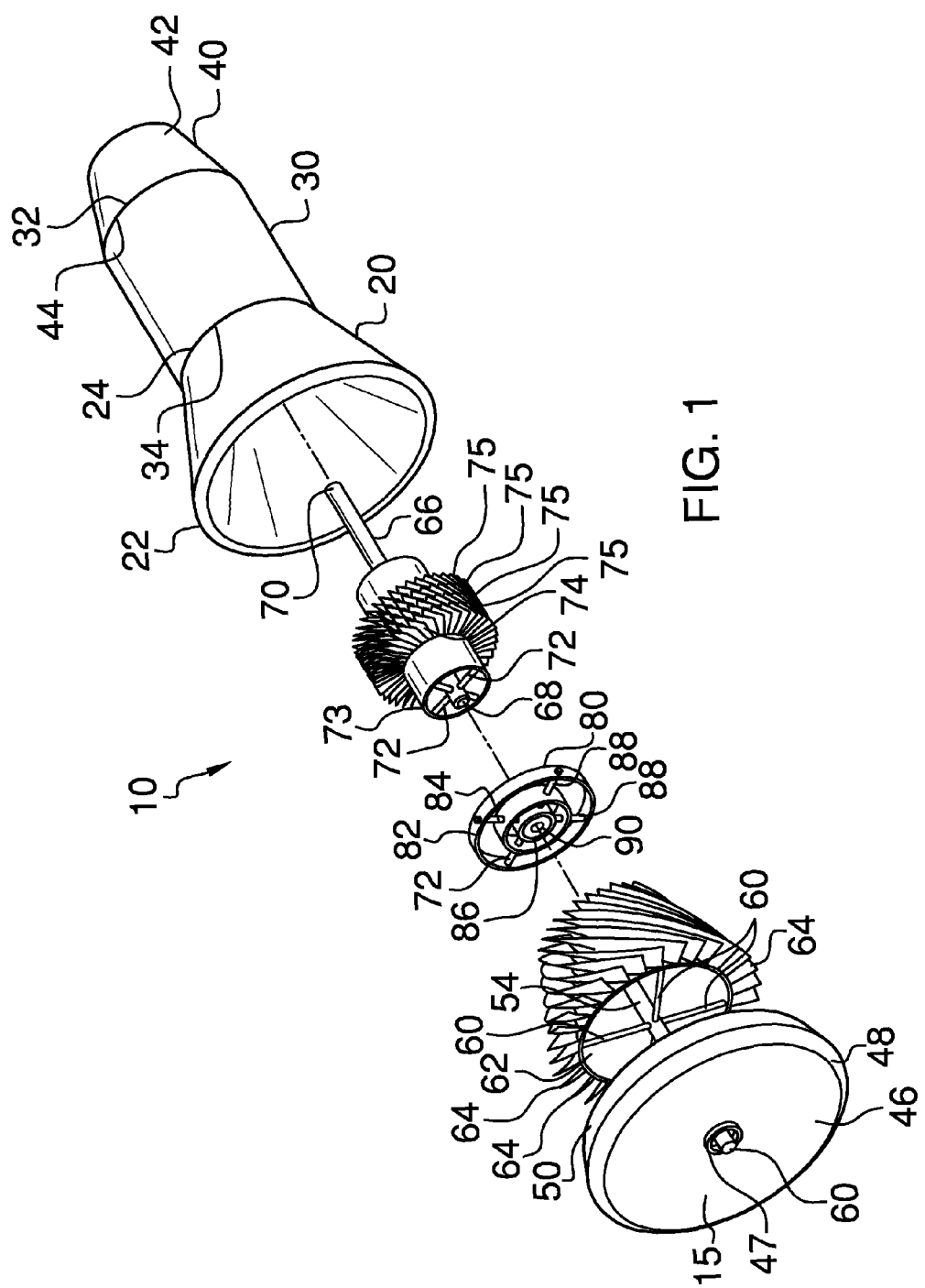
FIG. 1 is an exploded view.
Figure 2:
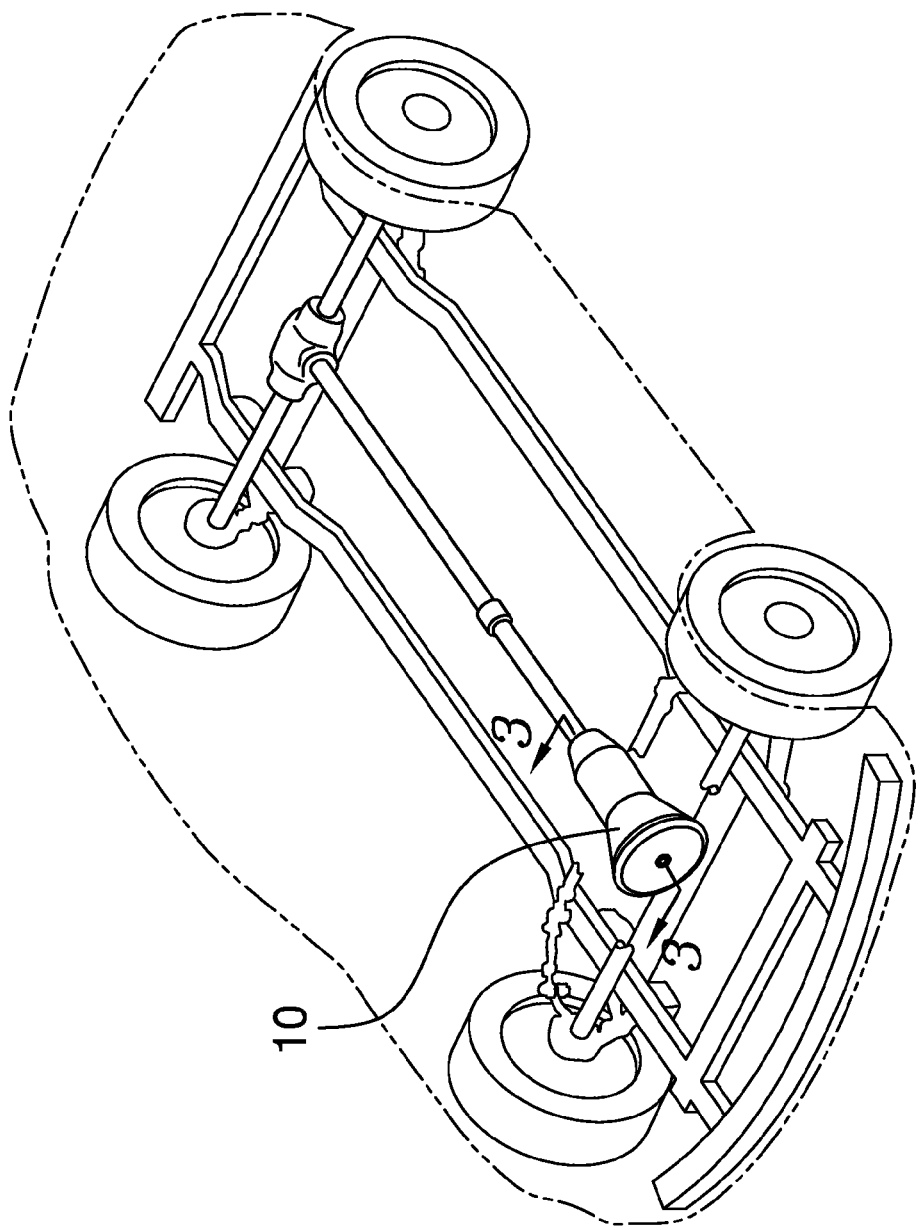
FIG. 2 is an in use view.
Figure 3:
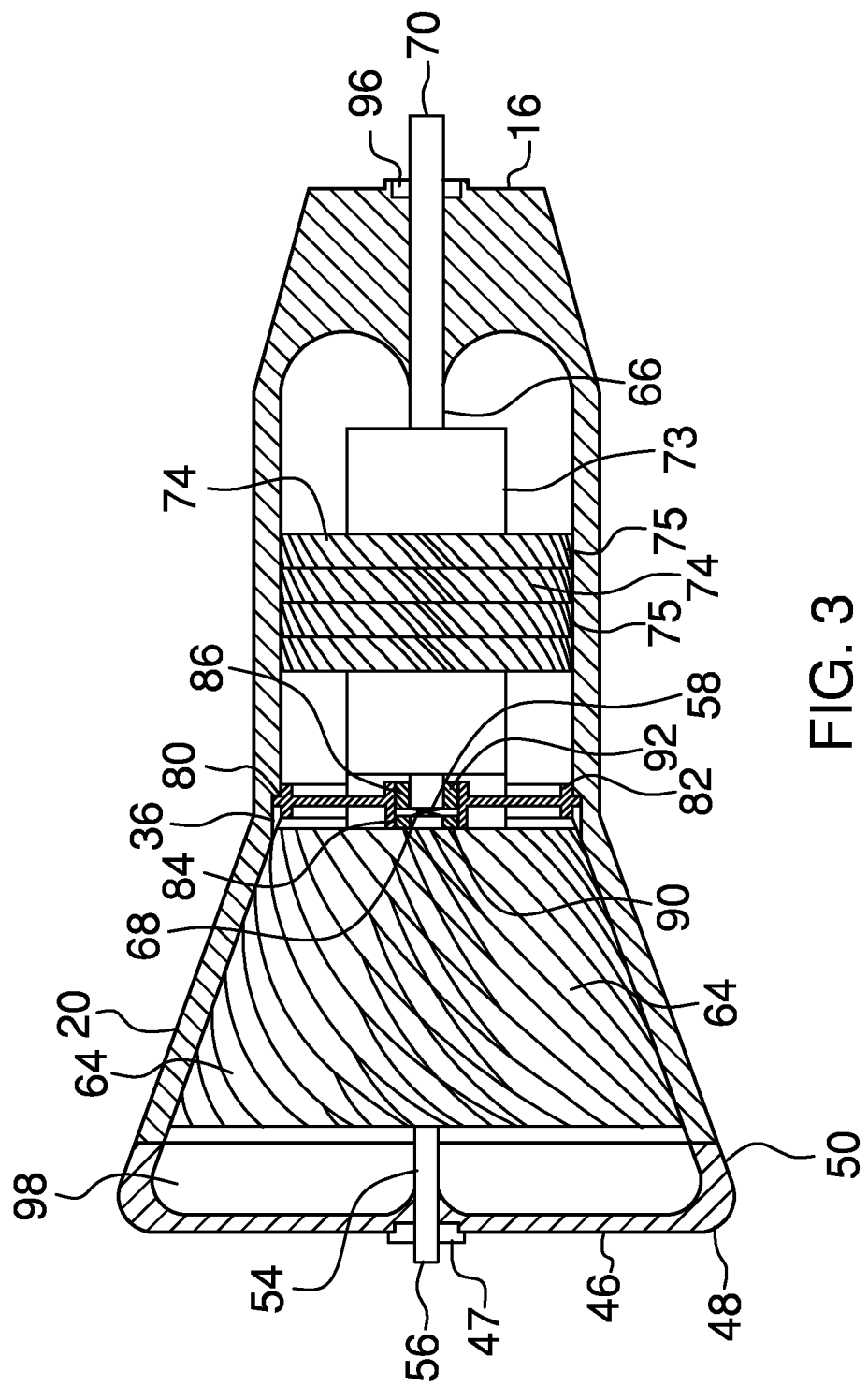
FIG. 3 is a cross sectional view.

With reference now to the drawings, and in particular FIGS. 1 through 3 thereof, an example of the gearless fluidic automatic transmission employing the principles and concepts of the present gearless fluidic automatic transmission and generally designated by the reference number 10 will be described.

Referring to FIGS. 1 through 3, the gearless fluidic automatic transmission 10 has an origin 15 and a terminus 16 spaced apart from the origin 15. A frustoconical first housing 20 has a first larger end 22 disposed adjacent the origin 15 and a first smaller end 24 spaced apart from the first larger end 22. A frustoconical second housing 30 has a second smaller end 34 affixed to the first smaller end 24. A second larger end 32 is spaced apart from the second smaller end 34. An inset 36 is disposed within the first smaller end 24 and the second smaller end 34. A frustoconical third housing 40 has a third larger end 44 affixed to the second larger end 32. A third smaller end 42 is spaced apart from the third larger end 44. The third smaller end 42 is the terminus 16.

A provided cover plate 46 has a centrally disposed first bearing 47. The cover plate 46 has a perimeter bevel 48 and a tapered lip 50 facing the terminus 16. The tapered lip 50 removably fits to the first larger end 22. An impeller shaft 54 has a first end 56 and a second end 58 spaced apart from the first end 56. The impeller shaft 54 is disposed within the first housing 20 and within the second housing 30 second smaller end 34. The first end 56 is disposed through the first bearing 47. The impeller shaft 54 is configured to be turned by an engine. A plurality of equally spaced apart impeller rays 60 radiates outwardly from the impeller shaft 54. A hollow impeller frustum 62 is supported distally from the impeller shaft 54 by the impeller rays 60. A plurality of equally spaced apart canted curvilinear vanes 64 is disposed outwardly on the hollow impeller frustum 62.

A turbine shaft 66 is disposed centrally within the second housing 30 and the third housing 40. The turbine shaft 66 has a shaft first end 68 and a shaft second end 70. A plurality of equally spaced apart turbine rays 72 radiates outwardly from the turbine shaft 66. A hollow cylinder 73 is supported distally from the turbine shaft 66 by the turbine rays 72. A plurality of canted blades 74 radiates outwardly from the hollow cylinder 73. The canted blades 74 are disposed centrally on the cylinder 73. The canted blades 74 are disposed in a plurality of rows 75.

A provided bearing assembly 80 has an outer annulet 82 spaced apart from an inner annulet 84 disposed medially to the outer annulet 82. The bearing assembly 80 is disposed within the inset 36. A bearing race 86 is disposed within and spaced apart from the inner annulet 84. The outer annulet 82, the inner annulet 84, and the bearing race 86 are supported by a plurality of equally spaced apart turbine rays 94. A second bearing 90 is disposed within the bearing race 86. The second end 58 is disposed within the second bearing 90. A third bearing 92 is disposed within the bearing race 86. A third bearing 92 is disposed within the bearing race 86. The third bearing 92 is more proximal the terminus 16 than the second bearing 90. The impeller shaft 54 is disposed within the first bearing 47 and the second bearing 90. A fourth bearing 96 is disposed centrally within the terminus 16. The turbine shaft 66 is disposed within the third bearing 92 and the fourth bearing 96. The canted curvilinear vanes 64 and the canted blades 74 are canted in a like direction.

A fluid 98 is disposed within the first housing 20, the second housing 30, and the third housing 40. The fluid 98 is configured to flow boustrophedonically through the vanes 64 and the blades 74, followed by flow through the bearing assembly 80 and the impeller rays 60. As the engine drives the impeller shaft 54, the canted curvilinear vanes 64 are turned. The canted blades 74 are driven by the fluid 98 pushed by the canted curvilinear vanes 64. A speed of the canted blades 74 is determined by a velocity of the impeller shaft 54 which in turn determines a velocity of the turbine shaft 66. The turbine shaft 66 transfers power to a vehicle. A viscosity of the fluid 98 also determines the turbine shaft 66 velocity. The fluid 98 returns progressively from the third housing 40 through the hollow cylinder 72, the bearing assembly 80, through the hollow impeller frustum 62 and into the first housing 20 where the fluid 98 is subject to a continuous further like travel.

What is claimed is:

1. A gearless fluidic automatic transmission comprising:

an origin and a terminus spaced apart from the origin;

a frustoconical first housing having a first larger end disposed adjacent the origin, a first smaller end spaced apart from the first larger end;

a frustoconical second housing having a second smaller end affixed to the first smaller end, a second larger end spaced apart from the second smaller end;

a frustoconical third housing having a third larger end affixed to the second larger end, a third smaller end spaced apart from the third larger end, the third smaller end disposed at the terminus;

an inset disposed within the first smaller end and the second smaller end;

a cover plate disposed adjacent the origin, the cover plate having a perimeter taper, a tapered lip facing the terminus, the tapered lip removably fitted to the first larger end;

a first bearing disposed centrally within the cover plate;

an impeller shaft having a first end disposed at the origin and a second end spaced apart from the first end, the impeller shaft disposed within the first housing, the first bearing, and within the second housing second smaller end;

wherein the impeller shaft is configured to be turned by an engine;

a plurality of equally spaced apart impeller rays radiating outwardly from the impeller shaft;

a hollow impeller frustum supported distally from the impeller shaft by the impeller rays;

a plurality of equally spaced apart canted curvilinear vanes disposed outwardly on the hollow impeller frustum;

a turbine shaft disposed centrally within the second housing and the third housing, the turbine shaft having a shaft first end and a shaft second end;

a plurality of equally spaced apart turbine rays radiating outwardly from the turbine shaft;

a hollow cylinder supported distally from the turbine shaft by the turbine rays;

a plurality of canted blades radiating outwardly from the hollow cylinder, the canted blades disposed centrally on the cylinder, the blades disposed in a plurality of rows;

a bearing assembly having an outer annulet spaced apart from an inner annulet disposed medially to the outer annulet, a bearing race disposed within and spaced apart from the inner annulet, the outer annulet, the inner annulet, and the bearing race supported by a plurality of equally spaced apart turbine rays;

a second bearing disposed within the bearing race, the impeller shaft disposed in the second bearing;

a third bearing disposed within the bearing race;

a fourth bearing disposed centrally within the terminus, the turbine shaft disposed within the third bearing and the fourth bearing; and a fluid disposed within the first housing, the second housing, the third housing;
wherein the fluid is configured to flow boustrophedonically through the vanes and the blades, followed by flow through the turbine rays, the bearing assembly, and the impeller rays; and
wherein the canted curvilinear vanes and the canted blades are canted in a like direction.

* * * * *